United States Patent [19]
Berndt et al.

[11] 3,905,489
[45] Sept. 16, 1975

[54] STACKING OF BRICKS

[75] Inventors: Walter Berndt, Laggenbeck, Germany; Helmut F. Lauff, Furlong, Pa.

[73] Assignee: C. Keller & Co., Laggenbeck, Germany

[22] Filed: Apr. 19, 1974

[21] Appl. No.: 462,513

[30] Foreign Application Priority Data
Oct. 26, 1973  Germany............................ 2353753

[52] U.S. Cl. ................................. 214/6 A; 198/34
[51] Int. Cl. ........................................... B65g 57/24
[58] Field of Search ..... 214/6 A, 6 M, 8.5 C, 6 DK; 198/34

[56] References Cited
UNITED STATES PATENTS
3,608,746  9/1971  Meyer................................ 214/6 A
3,656,635  4/1972  Schafer et al..................... 214/8.5 C
3,776,398  12/1973  Stuart et al. ..................... 214/8.5 C Primary Examiner—Robert J. Spar
Assistant Examiner—Leslie J. Paperner
Attorney, Agent, or Firm—Mason, Mason & Albright

[57] ABSTRACT

Bricks are removed in layers from a kiln trolley and are formed in re-arranged layers on collecting tables. The layers are then transferred to a stacking table on which a stack of bricks is formed. If the bricks on the collecting tables are of a different shade to those on the stacking table, they are transferred to storage tables until such time as the bricks on the stacking table are of the same shade, the bricks then being transferred from the storage tables to the stacking table. Transfer of bricks to and from the storage tables is effected by pivotal gripper means.

3 Claims, 6 Drawing Figures

STACKING OF BRICKS

BACKGROUND OF THE INVENTION

1. Field of the Invention

The present invention relates to the stacking of bricks.

2. Description of the Prior Art

It is known that bricks which are baked in a reducing atmosphere acquire different shades as a result of the varying temperatures. For example, the layer of bricks which is topmost during the baking process has a different shade from the layers underneath which are not exposed to these high temperatures to the same extent as the topmost layer of bricks. In order to obtain a uniform shade when constructing a building with a facade erected from bricks of this type, it has hitherto been necessary to sort the layers by hand after destacking in order to separate the layers of different shades. This sorting operation is exceedingly time-consuming, expensive and complicated.

SUMMARY OF THE INVENTION

According to the present invention, there is provided a device for forming stacks of bricks of uniform shade, said device comprising first conveyor means, second conveyor means parallel to the first conveyor means, means operative to transfer layers of bricks from a kiln trolley onto the first conveyor means and to transfer some of said bricks on said first transfer means onto said second transfer means, a first pair of conveyors arranged at the downstream end portion of the first conveyor means and extending transversely thereto whereby each of said conveyors receives a row of bricks from the first conveyor means, a second pair of conveyors arranged at the downstream end portion of the second conveyor means and extending transversely thereto whereby each of said conveyors receives a row of bricks from the second conveyor means, a plurality of transfer means each associated with a respective one of the conveyors, a plurality of collecting tables associated with the transfer means, the transfer means being operative to transfer rows of bricks from the associated conveyor onto a said collecting table whereby a re-arranged layer is formed on the collecting table, a lowerable stacking table positioned to receive layers of bricks from the collecting tables whereby a stack is formed on the stacking table, storage tables associated with the collecting tables, and pivotal gripper means operative to transfer layers of bricks from the collecting tables to the storage tables when the bricks on the collecting tables are of a different shade to those on the stacking table, and to transfer layers of bricks from the storage tables to the stacking table to be intermixed with the bricks thereon when the shade of the bricks on the storage tables is the same as that on the stacking table.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
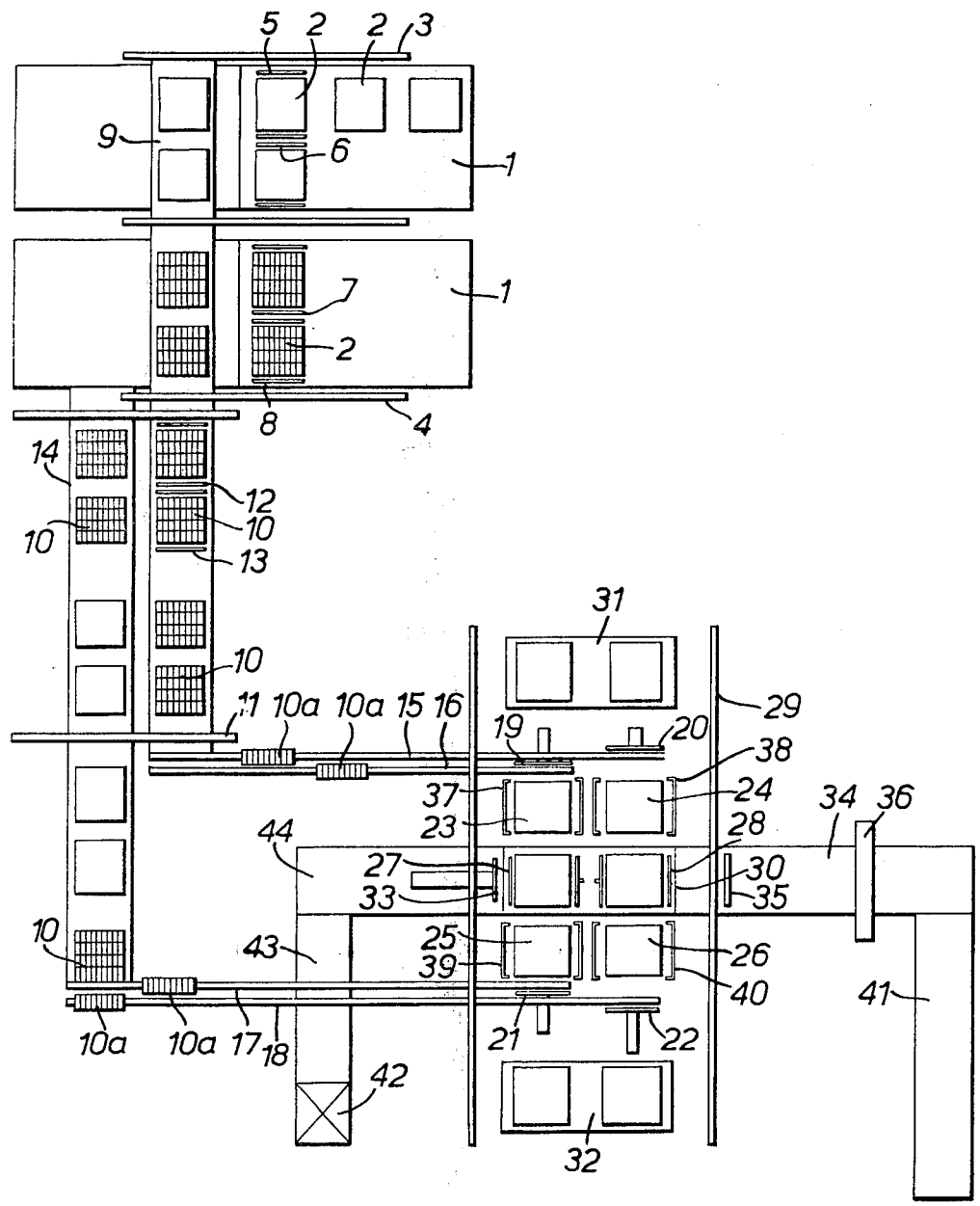
FIG. 1 is a plan view of a device according to the invention.

The reference numeral 1 (FIG. 1) refers to kiln trolleys which deliver the bricks baked in a reducing atmosphere in loose stacks 2.

The kiln trolleys 1 are pushed underneath crane runways 3, 4 in such a manner that gripper means 5, 6, 7 and 8 travelling on these runways 3, 4 can dismantle the stacks 2 in layers or double layers.

The gripper means 5 to 8 deposit the individual layers or double layers on transport means 9 in such a way that the narrow sides of the bricks are directed downwardly and the long sides of the bricks extend in the direction of movement of the transport means 9. The transport means 9 projects into the zone of movement of the gripper means 5 to 8.

The transport means 9 can be a conveyor belt or a gravity roller conveyor.

The layers or double layers present on this transport means 9 pass beneath a further crane runway 11 where the double layers of the stacks 2 are separated by gripper means 12, 13 in such a way that individual or single layers are formed. The gripper means 12, 13 grip the upper layer of the double layer, lift it from the layer underneath and deposit it on a further transport means 14 arranged parallel to the transport means 9.

If the transport means 9 conveys only single layers, the gripper means 12, 13 transfer every third and fourth layer conveyed by the transport means 9 to the transport means 14.

The layers 10 present on the transport means 9, 14 pass into the end portion of these two transport means 9, 14 where the individual rows 10a of the layers 10 are transferred to relatively narrow conveyor belts 15, 16, 17 and 18 arranged transversely to the direction of movement of the two transport means 9, 14. As shown in FIG. 1, the pairs of conveyor belts 15, 16 and 17, 18 are arranged in parallel and are spaced by a distance corresponding to the staggering of the two transport means 9, 14.

Each of the conveyor belts 15 to 18 is associated with a respective transfer means 19, 20, 21 and 22.

The bricks which are present on the conveyor belts 15 to 18 in individual rows 10a are then fed to the transfer means 19 to 22 where a number of bricks are collected, the number of bricks correspond to the width of the stack to be formed.

The rows of bricks 10a thus pass in accordance with the width of the stack to be formed into the operative zone of the transfer means 19 to 22 which continuously push the brick rows 10a from the conveyor belts 15 to 18 onto collecting tables 23, 24, 25, 26 in such a manner that a re-arranged layer of bricks is formed on each collecting table 23 to 26.

The layers of bricks having a uniform shade are lifted by gripper means 27, 28 (which travel on a runway 29 and are pivotal about a vertical axis) from the collecting tables 23 to 26 and successively deposited on a stacking table 30 which can be lowered stepwise. By repeatedly depositing re-arranged layers of bricks, stacks are formed on the table 30.

Figure 5:
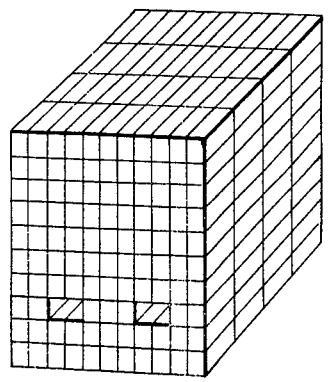
FIGS. 5 and 6 are perspective views of two forms of stacks produced by the device.

The stack shown in FIG. 5 of the drawing is formed by pushing four rows of bricks 10a with eleven bricks from the conveyor belts 15 to 18 and collecting them on the collecting tables 23 to 26 to obtain re-arranged layers of bricks. These re-arranged layers of bricks are then stacked on the table 30; the resulting stacks do not require cross-bracing. These stacks are then transferred by pusher means 33 from the table 30 to a subsequent transport means 34 where a further pusher 34 conveys them to a strapping machine.

Figure 3:
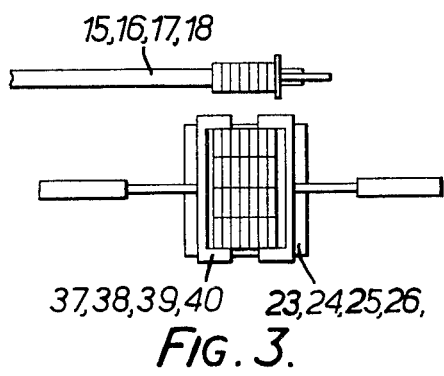
Figure 4:
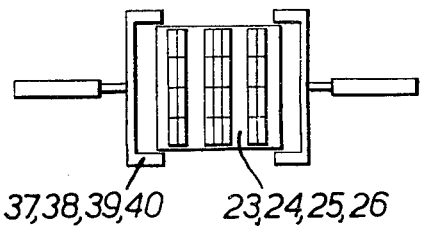

The stacks are arranged to be transported by a stacker truck, for which purpose the third layer from the bottom is provided with passages arranged to receive the arms of the fork-lift of the truck. This layer is formed by conveying four rows of bricks 10a with only seven bricks on to the collecting tables 23 to 26 (FIG. 3) where two tongs 37, 38 and 39, 40, respectively, which travel horizontally, pick up the two outer groups of brick rows and move them away from the central group of brick rows in an outward direction. These tongs 37, 38 and 39, 40 can be actuated, for example, by hydraulic means. In this way gaps are formed between the central group of brick rows and the two outer groups, as shown in detail in FIGS. 4 and 5.

Figure 6:
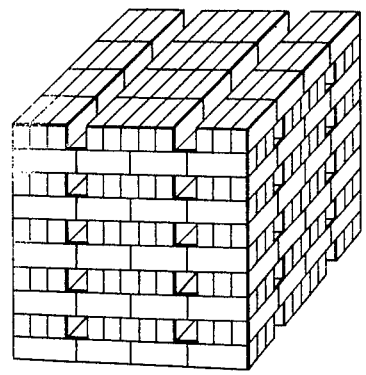

The stack shown in FIG. 6 is formed when the brick layers formed on the collecting tables 23 to 26 are unsuitable for the stacking process in progress because of their varying shade. In this case the individual layers of bricks are continuously lifted from the collecting tables 23 to 26 with the aid of the gripper means 27, 28 and are stacked on storage or lifting tables 31, 32 with alternate rotation through 90° for which purpose the gripper means 27, 28 are pivoted. The stacks are stored on these lifting tables 31, 32 or in any other suitable place until the freshly supplied bricks have a shade corresponding to that of the stored bricks. The bricks stored on the lifting tables 31, 32 are then removed in layers are are incorporated in the stack being formed on the table 30.

Figure 2:
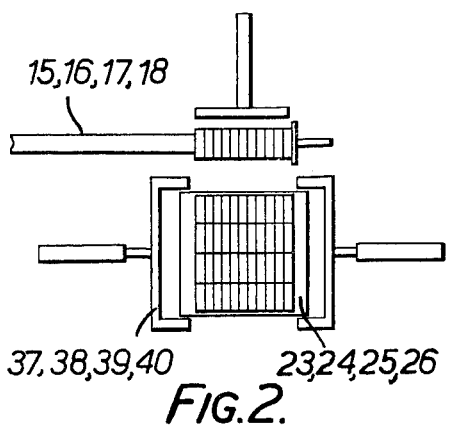
FIGS. 2 to 4 are plan views showing means for separating layers of bricks into three spaced groups of brick rows.

A stack according to FIG. 6 is also formed when the stack is to be covered with a shrunk-on foil hood. For this purpose, however, the layers of bricks must be formed in such a way that the stack does not tilt over when the layers of bricks are stacked cross-wise. In order to form these layers of bricks, four brick rows 10a with eleven bricks are removed from the conveyor belts 15 to 18 and collected on the collecting tables 23 to 26 to form layers of bricks (FIG. 2). Since the stack is square and these layers of bricks have a rectangular cross-section, the transverse rows in the layers of bricks are pulled apart by means of tongs 37, 38 or 39, 40 so that square layers of bricks are formed. Such a layer is clearly shown in FIG. 6 of the drawing.

The layers of bricks formed in this way are removed from the collecting tables 23 to 26 by the gripper means 27, 28 and are stacked on the table 30 or the lifting tables 31, 32. From the table 30 the stacks are transferred to the transport means 34 which conveys the packets onto transport means 41 arranged at right angles thereto. The stacks are moved on by this transport means 41 and are covered with foil which is subsequently shrunk in known manner.

The layers present on the lifting tables 31, 32 serve to intermediate layers and are intermixed with the other layers on the stationary table as required.

If the completed stacks are not to be strapped with steel band or covered with a foil hood, the bricks are stacked on pallets on which they are stored. In this case the pallets are conveyed from a pallet magazine 42 by transport means 43, 44 to the table 30 and placed on the lifting tables 31, 32. The stacks stacked on the pallets are then lifted from the tables 30 to 32 and are stored in another place. If these stored bricks are to be used, the pallets with the stacks are placed on the lifting tables 31, 32 from where the gripper means 27, 28 fetch the layers of bricks suitable for stacking and deposit them on the table 30.

The device particularly described is capable of forming, in a relatively simple manner, stacks of bricks having the same color and which can therefore be used on a building site without previous sorting.

What is claimed is:

1. A device for forming stacks of bricks of uniform shade, said device comprising
   first transport means,
   second transport means parallel to the first transport means,
   means operative to transfer layers of bricks from a kiln trolley onto the first transport means and to transfer some of said bricks on said first transport means onto said second transport means,
   a first pair of conveyors arranged at the downstream end portion of the first transport means and extending transversely thereto whereby each of said conveyors receives a row of bricks from the first transport means,
   a second pair of conveyors arranged at the downstream end portion of the second transport means and extending transversely thereto whereby each of said conveyors receives a row of bricks from the second transport means,
   a plurality of second transfer means each associated with a respective one of the conveyors,
   a plurality of collecting tables associated with the second transfer means, the second transfer means being operative to transfer rows of bricks from the associated conveyor onto a said collecting table whereby a re-arranged layer is formed on the collecting table,
   a lowerable stacking table positioned to receive layers of bricks from the collecting tables whereby a stack is formed on the stacking table,
   storage tables associated with the collecting tables, and
   pivotal gripper means operative to transfer layers of bricks from the collecting tables to the storage tables when the bricks on the collecting tables are of a different shade to those on the stacking table, and to transfer layers of bricks from the storage tables to the stacking table to be intermixed with the bricks thereon when the shade of the bricks on the storage tables is the same as that on the stacking table.

2. A device according to claim 1, further comprising means associated with each collecting table for separating each layer of bricks into three spaced groups of bricks.

3. A device according to claim 2, wherein said separating means comprises
   two tongs movable in a horizontal direction, each of said tongs being arranged to grip a respective group of bricks and to displace same outwardly.

* * * * *